United States Patent [19]

Wiese

[11] 4,266,786

[45] May 12, 1981

[54] MECHANICAL SEAL ASSEMBLY

[75] Inventor: Winfred J. Wiese, Whittier, Calif.

[73] Assignee: Borg-Warner Corporation, Chicago, Ill.

[21] Appl. No.: 66,279

[22] Filed: Aug. 13, 1979

[51] Int. Cl.³ .............................................. F16J 15/38
[52] U.S. Cl. ........................................ 277/40; 277/65; 277/83; 277/85; 277/93 SD
[58] Field of Search ............... 277/81 R, 83, 85, 93 R, 277/93 SD, 58, 65, 40, 41

[56] References Cited

U.S. PATENT DOCUMENTS

| | | | |
|---|---|---|---|
| 2,203,525 | 6/1940 | Dupree | 277/65 X |
| 2,246,277 | 6/1941 | Davidson | 277/65 X |
| 2,445,018 | 7/1948 | Brady | 277/40 |
| 2,586,739 | 2/1952 | Summers. | |
| 2,662,480 | 12/1953 | Cliborn | 277/65 X |
| 2,884,268 | 4/1959 | Amirault et al. . | |
| 2,912,265 | 11/1959 | Brummer . | |
| 3,035,841 | 5/1962 | Riester | 277/3 |
| 3,154,309 | 10/1964 | Voitik | 277/40 X |
| 3,260,530 | 7/1966 | Jelatis et al. | 277/65 X |
| 3,988,026 | 10/1976 | Kemp | 277/65 X |

FOREIGN PATENT DOCUMENTS 1088636  9/1954  France ...................... 277/65

Primary Examiner—Robert S. Ward, Jr.
Attorney, Agent, or Firm—Aubrey L. Burgess

[57] ABSTRACT

A mechanical seal assembly adapted to be associated with a rotatable shaft and a housing and having a rotatable seal ring and a stationary seal ring, each having seal faces which engage seal faces on a central seal ring, the latter seal ring being centered only on its outer diameter and being free to rotate relative to the other seal rings thus reducing the speed at the seal faces to the intermediate speed. An aspect of the disclosure is a double spring system wherein seal ring means associated with a shaft and a housing are urged toward one another.

8 Claims, 2 Drawing Figures

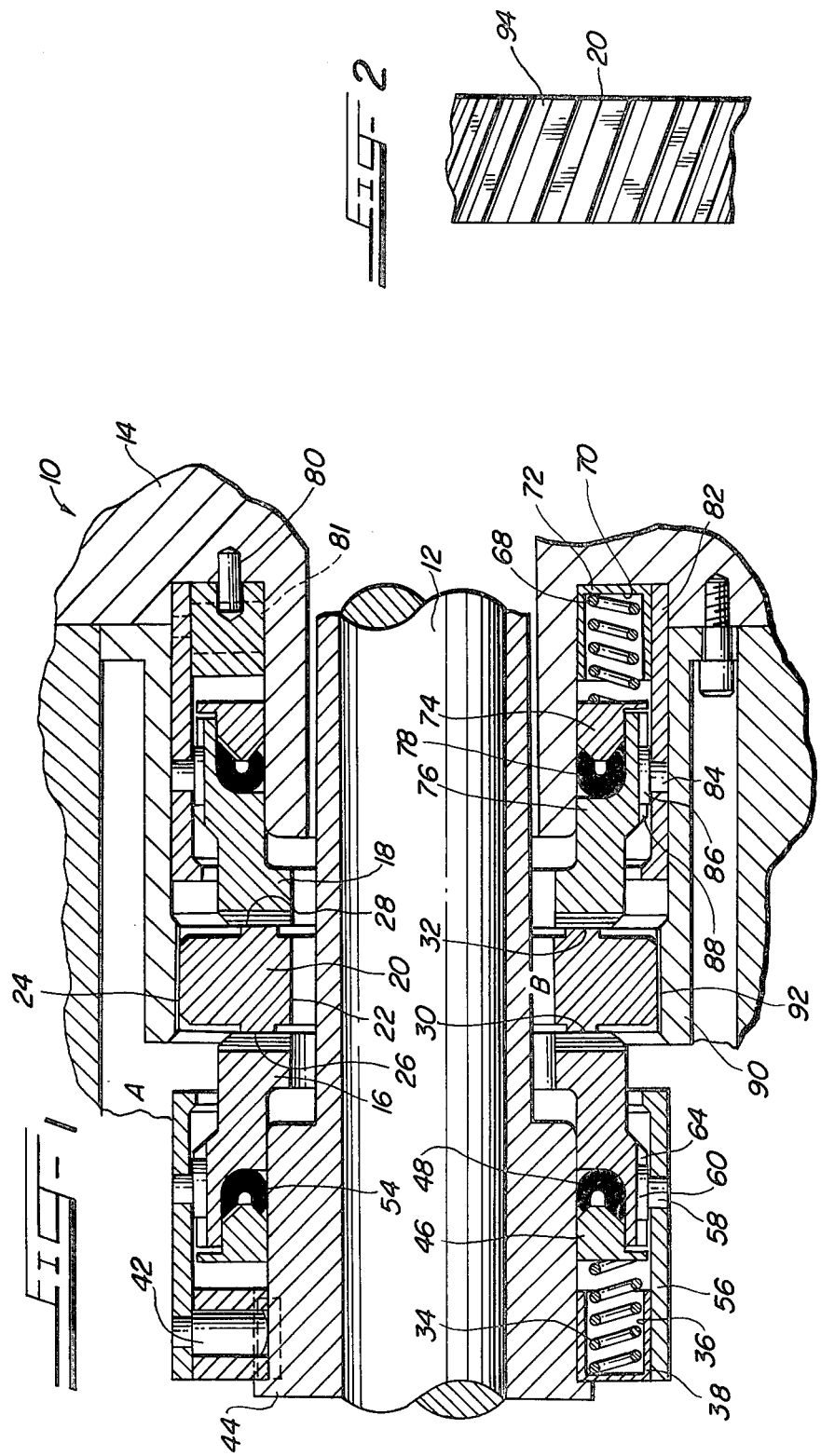

MECHANICAL SEAL ASSEMBLY

BACKGROUND OF THE INVENTION

Conventional mechanical seals are used to separate different fluids and comprise a rotatable seal ring rotationally connected to a rotatable shaft with a seal face engaging a seal face of a stationary seal ring connected to a housing and the like, one or both of the seal rings being axially movable and resiliently urged toward one another to insure seal face engagement. Distortion of the seal ring support, either the shaft or the housing which occurs primarily because of temperature considerations is transmitted to the seal rings causing distortion of the seal rings and malfunction of the seal. Wearing of the seal faces can be expected because of the speed of rotation therebetween which can become severe in high speed applications.

THE INVENTION

The mechanical seal assembly of this invention comprises a rotatable seal ring and a stationary seal ring, each having a seal face engaging axially spaced seal faces of a central seal ring. The expressions rotatable, and stationary seal rings and seal faces are used in their ordinary sense. These seal rings may be axially movable at least for limited distances.

The central seal ring is rotationally freely mounted in a circumferential sleeve forming a bearing therefor, the sleeve being connected to or made integral with a housing to which the stationary seal ring is connected. The central seal ring is thus centered on its outside diameter. The rotatable seal ring is connected to a shaft or a sleeve receivable around the shaft for rotation therewith.

Under ordinary conditions, the central seal ring will rotate at a speed generally intermediate that of the rotatable seal ring. Thus in high speed situations, there is less wear and heat checking of the rings because the surface speeds of the rings at the engaging seal faces are less than that encountered in the normal seal assembly of a pair of seal rings with engaging seal faces.

The seal assembly of this invention is also constructed such that the interior generally cylindrical surfaces of the stationary, rotatable and central seal rings are exposed to the fluid in one of the fluid zones. The seal rings literally sit on the fluid in that the connections of the rotatable and stationary seal rings to the shaft and the housing, respectively, being at the outer peripheries while the central seal ring "floats" in the housing sleeve. The fit of the central seal ring at its outer diameter and the presence of a fluid therearound provides what may be termed a lubricated bearing. The interior surfaces of the seal rings partially define the boundary of one of the fluid zones. The construction of the assembly as just described avoids problems of distortion and wear which can exist in ordinary mechanical seals where the seal rings are supported directly on a shaft, a shaft sleeve or a housing or housing sleeve, even in high speed applications.

In the assembly of this invention, resilient means, such as a plurality of springs in spring pockets acting through a U-cup, urge the rotatable and stationary seal rings axially toward the central seal ring; such resilient means may be provided for both the stationary and rotatable seal rings or for one or the other of said rings.

Another aspect of this invention is a double spring system in which seal ring means are associated with the shaft and the housing having at least a pair of faces contacting one another. Opposed spring means urge each of the contacting seal faces toward the other contacting seal face.

THE DRAWINGS

FIG. 1 is a partial sectional view of a mechanical seal assembly constructed according to this invention; and FIG. 2 is a side view of at least a portion of the central seal ring in the assembly of FIG. 1.

DETAILED DESCRIPTION

Attention is invited to the drawings which illustrate a mechanical seal assembly 10 adapted to be associated with a rotatable shaft 12 and a housing 14, the assembly separating different fluid in zones identified as A and B. The assembly 10 comprises a first, rotatable seal ring 16, a second, stationary seal ring 18, and a central seal ring 20 having generally cylindrical inner and outer surfaces 22 and 24, respectively. The central seal ring 20 is positioned between the seal rings 16 and 18 and has axially spaced seal faces 26 and 28. The seal ring 16 has a seal face 30 engaging the seal face 26 and the seal ring 18 has a seal face 32 engaging the seal face 28. While the seal rings 16 and 18 are referred to as rotatable and stationary, it is to be understood that this terminology is used in the conventional sense. These seal rings are also axially movable at least to a limited extent.

The seal ring 16 is resiliently urged toward the central seal ring 20 by a plurality of springs 34, each received in a spring pocket 36 circumferentially arranged in a spring holder 38 fitting around and connected by one or more keys 40 in keyways 42 in a sleeve 44 surrounding and connected to the shaft 12, so as to be rotatable with the shaft 12. Each spring bears against an expander ring 46 received in a U-shaped recess 48 of a U-cup end of the seal ring 16. An annular U-cup packing 54 of a resilient material is received in the recess 48 and is engaged by the expander ring 46. A sleeve 56 surrounds the seal ring 16 and the spring holder 40 and is connected to the latter by the pin 42, so that the sleeve 56 rotates with the sleeve 44. The sleeve 56 also receives a drive pin 58 with an enlarged head 60 which is received in a slot 64 in the seal ring 16. This connection insures non-rotation of the ring 16 relative to the sleeve 56 while permitting axial movement of the ring 16.

The seal ring 18 is resiliently urged toward the central ring 20 by a plurality of springs 68 each received in spring pockets 70 circumferentially arranged in a cylindrical member 72. Each spring 68 bears against an expander ring 74 received in a U-shaped recess 76 in a U-cup end of the seal ring 18. An annular U-cup packing 78 of a resilient material is received in the recess 76 and is engaged by the expander ring 74. The member 72 is connected by one or more drive pins 80 to the housing 14 and by a drive pin 81 to an annular sleeve 82.

The annular sleeve 82 surrounds the member 72 and extends over a portion of the seal ring 18. A drive pin 84 is connected to the sleeve 82 and has an enlarged head 86 received in a groove 88 in the seal ring 20. This permits axial movement of the ring 18 without rotation. A flanged cylindrical member 90 is bolted to the housing 14 and surrounds the seal ring 18. The member 90 extends over the central seal ring 20.

The member 90 provides a bearing journal for the central seal ring 20; this insures concentricity of the parts. The member 90 may be coated with graphite or the like on its bearing surface, i.e., the surface 92 located opposite the center surface of the seal ring 20. In the event the central seal 20 is made of carbon and the like, the surface 92 could be coated with stellite and the like—a hard surface material.

The center seal ring 20 is free to rotate; it may be slotted at its periphery, as at 94, (shown in FIG. 2 as being angled with respect to the longitudinal axis of the ring 20) which slots insure fluid to be present on both sides of the central ring 20, so that fluid is present at the interface of the surfaces 26 and 30 and 28 and 32. Generally, in such seals, fluid leaks across the contacting faces to cool and lubricate the relatively rotating faces.

I claims:

1. In a mechanical seal assembly adapted to be associated with a rotatable shaft and a housing and between a first and second zone each containing a different fluid comprising:
   a first seal ring having a seal face;
   a second seal ring having a seal face;
   means connecting said first and second seal rings to said shaft and housing, respectively, permitting limited axial movement of said first and second seal rings; the improvement which comprises:
   a central seal ring positioned between said first and second seal rings and having a pair of seal faces, one of which engages said first seal face and the other of which engages said second seal face;
   said central seal ring being free of connection with said shaft and said housing and encircling said shaft,
   said housing centering said central ring and forming a bearing therefor.

2. A mechanical seal assembly as in claim 1, further comprising resilient means urging said first and second seal rings axially toward said central seal ring.

3. A mechanical seal assembly as in claim 1, further comprising means defining slots in the outer periphery of said central seal ring.

4. A mechanical seal assembly as in claim 3, in which said means defining said slots are acutely angled with respect to said shaft.

5. A mechanical seal assembly as recited in claim 1, wherein said central seal ring has an interior generally cylindrical surface spaced from said shaft and exposed to one of said fluids, said central seal ring interior surface forming a portion of a boundary of one of said zones.

6. A mechanical seal assembly as recited in claim 1, wherein said first seal ring has an interior generally cylindrical surface which is spaced from said shaft and exposed to one of said fluids, said first seal ring interior surface forming a portion of a boundary of one of said zones.

7. A mechanical seal assembly as recited in claim 1, wherein said second seal ring has an interior generally cylindrical surface which is spaced from said shaft and exposed to one of said fluids, said second seal ring interior surface forming a portion of a boundary of one of said zones.

8. A mechanical seal assembly as recited in claim 1, in which each of said seal rings has a generally cylindrical interior surface, each of said interior surfaces being exposed to one of said fluids.

* * * * *